United States Patent
Fougere et al.

(10) Patent No.: US 7,590,049 B1
(45) Date of Patent: Sep. 15, 2009

(54) SYSTEM AND METHOD FOR CONFIGURING A NETWORK ELEMENT TO SUPPORT PROTECTION SWITCHING IN AN OPTICAL NETWORK

(75) Inventors: Sandra Fougere, Nepean (CA); Christopher Brown, Ottawa (CA); Craig Suitor, Nepean (CA); Craig Parker, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 601 days.

(21) Appl. No.: 10/961,792

(22) Filed: Oct. 8, 2004

Related U.S. Application Data (60) Provisional application No. 60/510,048, filed on Oct. 9, 2003.

(51) Int. Cl.
*H04L 12/28* (2006.01)
(52) U.S. Cl. .................. 370/217; 370/221; 370/225; 398/2
(58) Field of Classification Search ......... 370/216–228, 370/236–236.2, 241–253, 401, 465, 516, 370/535, 539; 398/1–8, 56–57
See application file for complete search history.

(56) References Cited

U.S. PATENT DOCUMENTS

| | | | | |
|---|---|---|---|---|
| 5,805,568 A | * | 9/1998 | Shinbashi | 370/223 |
| 5,930,232 A | * | 7/1999 | Miller | 370/216 |
| 6,934,248 B1 | * | 8/2005 | DeBoer et al. | 370/217 |
| 7,016,379 B2 | * | 3/2006 | Falkenstein et al. | 370/535 |
| 7,043,541 B1 | * | 5/2006 | Bechtolsheim et al. | 709/223 |
| 7,170,851 B1 | * | 1/2007 | Chen et al. | 370/222 |
| 7,197,008 B1 | * | 3/2007 | Shabtay et al. | 370/218 |
| 2002/0080445 A1 | * | 6/2002 | Falkenstein et al. | 359/127 |
| 2003/0058789 A1 | * | 3/2003 | Sugawara et al. | 370/222 |
| 2003/0233579 A1 | * | 12/2003 | Kimura et al. | 713/201 |
| 2004/0076175 A1 | * | 4/2004 | Patenaude | 370/465 |
| 2005/0141568 A1 | * | 6/2005 | Kwak et al. | 370/539 |
| 2006/0045027 A1 | * | 3/2006 | Galou et al. | 370/255 |
| 2006/0206635 A1 | * | 9/2006 | Alexander et al. | 710/22 |

FOREIGN PATENT DOCUMENTS

EP          824292 A2 *  2/1998

* cited by examiner

*Primary Examiner*—Aung S Moe
*Assistant Examiner*—Habte Mered
(74) *Attorney, Agent, or Firm*—Guerin & Rodriguez, LLP; Michael A. Rodriguez (57) ABSTRACT

A system and method for configuring a network element to support protection switching in an optical network are described. The network element can operate according to the SONET, SDH, or both optical transport standards. Each tributary card of the network element has a baseline set of triggering parameters for supporting each protection scheme of both optical transport standards. A baseline parameter set for a given protection scheme has those triggering parameters that are common to SDH and SONET optical transport standards. One or more additional triggering parameters may be needed by a tributary card to complete the implementation of a particular protection scheme. These additional triggering parameters can be sent to the tributary cards, as needed, to supplement the baseline parameter sets.

18 Claims, 5 Drawing Sheets

SYSTEM AND METHOD FOR CONFIGURING A NETWORK ELEMENT TO SUPPORT PROTECTION SWITCHING IN AN OPTICAL NETWORK

RELATED APPLICATIONS

This application claims the benefit of U.S. Provisional Application No. 60/510,048 filed on Oct. 9, 2003, titled "Baseline Default Configuration of a Network Element for Supporting Protection Schemes," the entirety of which provisional application is incorporated by reference herein.

FIELD OF THE INVENTION

The invention relates to protection switching in optical networks. More specifically, the invention relates to an optical network element configurable to support protection switching either in SONET or in SDH telecommunications networks.

BACKGROUND

The standard for optical transport of telecommunications in North America is Synchronous Optical Network or SONET and in other parts of the world there is a variant referred to as Synchronous Digital Hierarchy or SDH. The SONET and SDH standards specify various protection schemes such as line protection, ring protection, and path protection. Conventionally, a line comprises one or more network sections or spans between network elements. In SONET, a path is a logical connection between a point where a Synchronous Transport Signal (STS) or a Virtual Tributary (VT) (equivalent terms in SDH are Access Unit (AU) and Tributary Unit (TU), respectively) is multiplexed into the transport network and the point where the signal is demultiplexed.

Line, ring, and path protection schemes depend upon the various transport network architectures in which the schemes are operating, such as linear networks and ring networks (e.g., virtual line-switched ring or VLSR, unidirectional path-switched ring or UPSR, two- and four-fiber bi-directional line switched rings or BLSR). Whereas SONET and SDH support such protection schemes, these standards refer to them by different names. For example, in SONET, one type of line protection is called 1+1; in SDH the same type of line protection is referred to as MSP. One example of path switching in SONET is UPSR; in SDH, SNCP. As another example, one form of ring protection in SONET is BLSR; for SDH, MSSPring. Additional types of protection schemes include, for example, 1:N linear protection switching.

Corresponding SONET and SDH protection schemes specify different requirements for triggering their protection operation. In general, when shipped from the factory, network elements to be deployed in a synchronous data communications network are configured to support protection switching according to one optical transport standard or the other. That is, a network element is configured to provide protection switching either for SONET or for SDH. Therefore, to support both SONET and SDH, manufacturers need to produce two type of network elements, which results in increased costs to the manufacturer.

SUMMARY

In one aspect, the invention features a method of configuring a network element to support protection switching in an optical network. The method includes determining a default set of triggering parameters common to SDH and SONET optical transport standards for providing protection switching, configuring a network element with the default set of triggering parameters, and adding another triggering parameter to the default set if the network element is deployed in a type of network requiring at least one other triggering parameter to provide protection switching.

In another aspect, the invention features a network element for use in either a SDH or SONET network. The network element includes a shelf processor card, a plurality of other cards, and an interface. The shelf processor cards stores a set of triggering parameters. The set of triggering parameters is sufficient to perform protection switching in an SDH and in an SONET network. The plurality of other cards are configured with a default set of triggering parameters that are common to SDH and SONET optical transport standards. The interface provides a means to add at least one other triggering parameter to the default set if the network element is deployed in a type of network requiring another triggering parameter to provide protection switching.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention features a network element capable of operating either in a SONET or in an SDH environment and of supporting the various line, path, and ring protection schemes for each optical transport standard. Each type of protection scheme has a set of parameters, and these parameters define criteria that trigger a protection switch. Hereafter, such parameters are called triggering parameters. For each type of protection scheme, SONET and SDH can have one or more of the same triggering parameters (referred to as common triggering parameters) and one or more different triggering parameters.

In a default configuration, the network element uses a set of baseline parameters (also referred to as baseline parameters sets) for each type of protection scheme: line, path, and ring protection. As used herein, a set of baseline parameters refers to the triggering parameters common to the SDH and SONET optical transport standards for one type of protection scheme. A default configuration includes each baseline parameter set for each type of protection scheme to be supported by the network element. It should be understood that the invention is not limited to line, path, and ring protection schemes. Instead, the invention can be used with any type of protection scheme having common and differing parameters for different optical transport standards. To reach a full SONET or full SDH implementation for a given type of protection scheme, the network element has provisionable features that can be user-activated so that one or more additional triggering parameters can be added to one or more of the baseline parameter sets.

Figure 1:
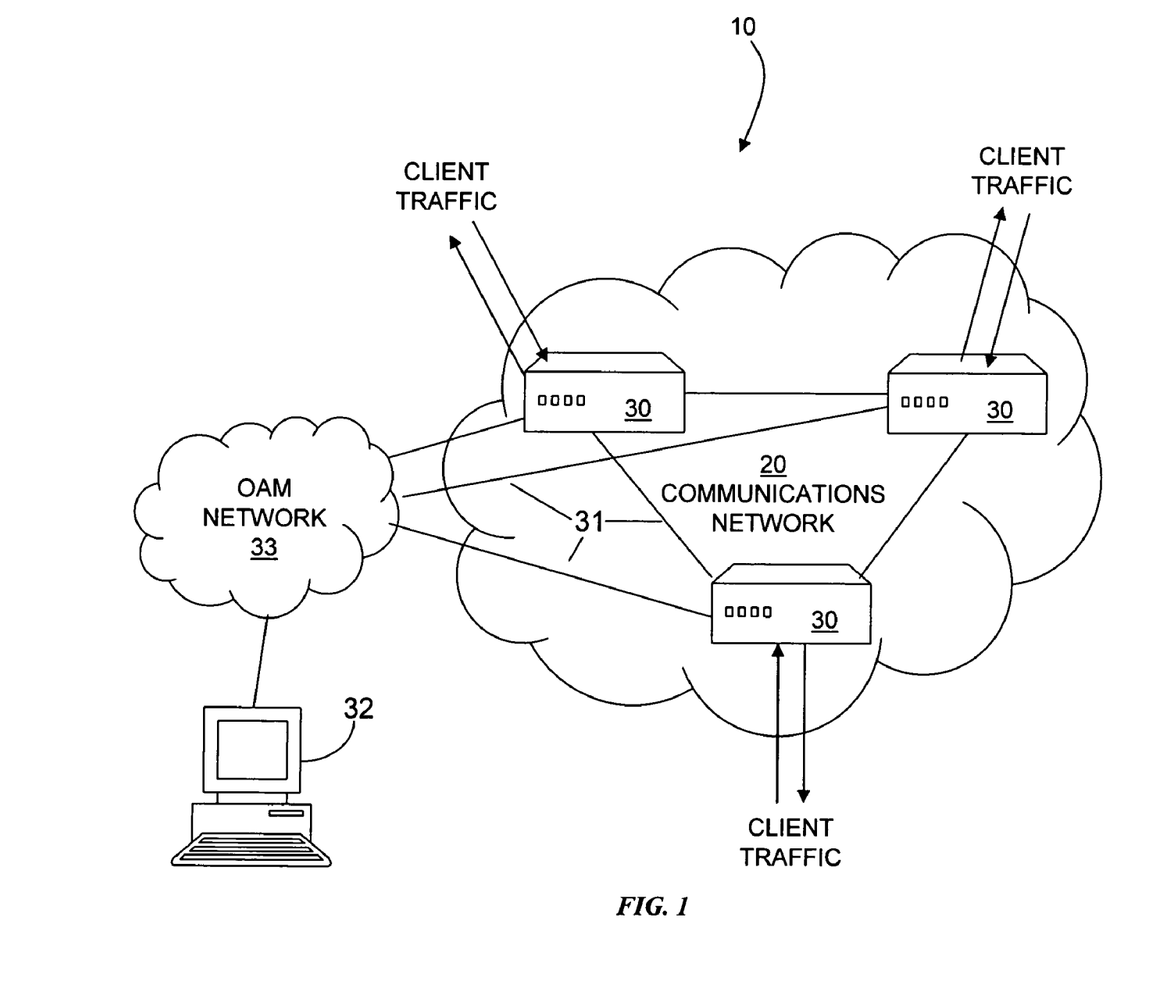
FIG. 1 is a representation of a telecommunications network in which an embodiment of the invention may be practiced.

FIG. 1 illustrates a telecommunications network 10 in which the invention can be practiced. The telecommunications network 10 includes a communications network 20 having a number of network elements 30 (only three shown for clarity), communication paths 31, and other network components (not shown). As shown, the network elements 30 can communicate with various network devices to receive communication traffic (i.e., payload traffic and OAM traffic). Each network element 30 includes a number of shelf cards. Each shelf card is configured with a default configuration (i.e., a set of baseline parameters for each type of protection scheme). The shelf cards have various functionalities that are described in more detail below. Communications traffic that is introduced to the communications network 20 is received by one of the network elements 30, transmitted along one or more communications paths 31, and delivered to a destination by another of the network element 30.

The network elements 30 are in communication with a remote device 32 (e.g., a computer system) and are managed by the remote device 32 through an OAM network 33 that is typically independent of the communications network 20. Management includes issuing commands, such as TL1 (Transaction Language 1) commands, from the remote device 32 to the network elements 30, and modifying the default configuration to provide additional triggering parameters for one or more of the protection schemes in accordance with the principles of the invention.

Figure 2:
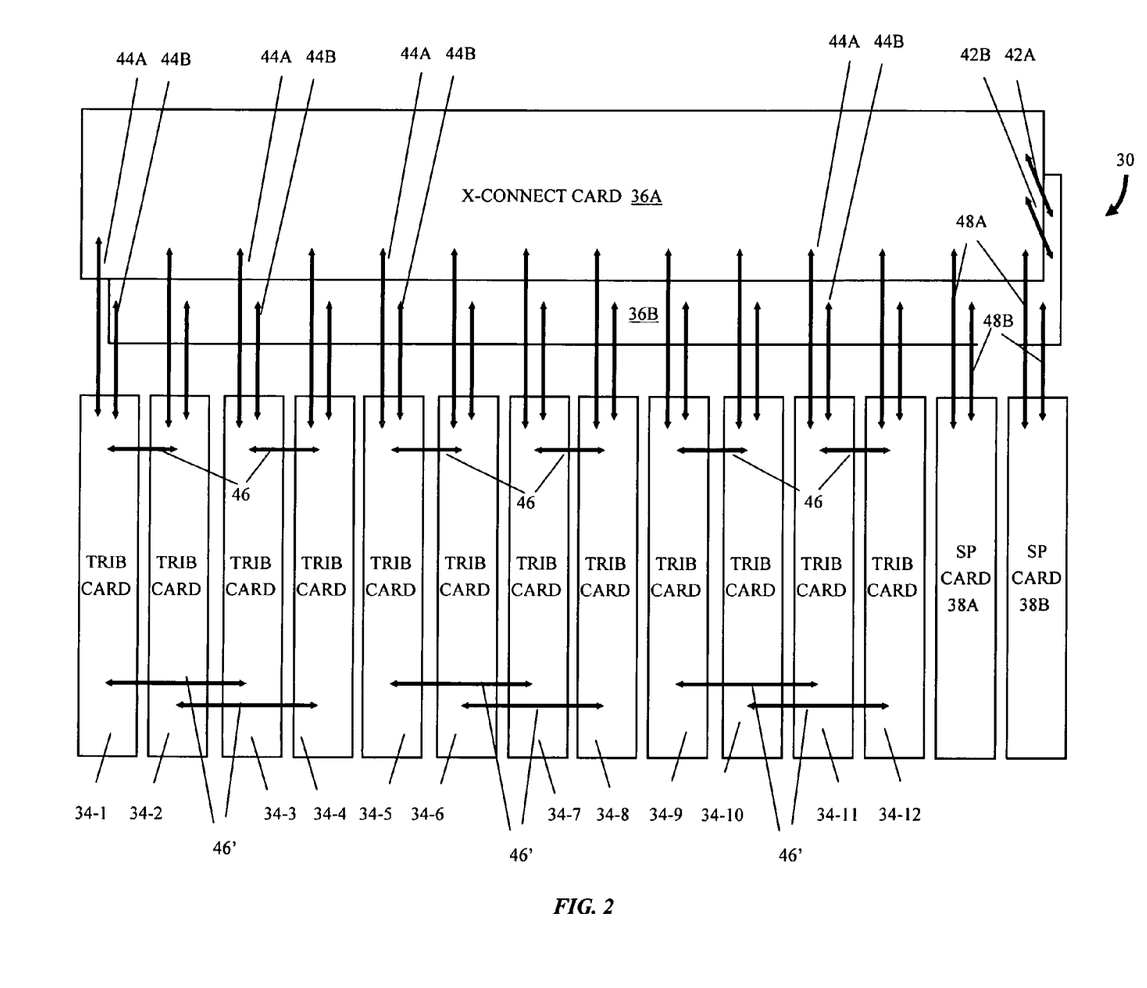
FIG. 2 is a system diagram of a network element in which principles of the invention may be practiced.

FIG. 2 shows an embodiment of the network element 30, constructed in accordance with the principles of the invention and operable according to the SONET standard, the SDH standard, or both SONET and SDH standards. The network element 30 includes a plurality of tributary cards 34-1 through 34-12 (generally, Trib card 34), redundant cross-connect cards 36A, 36B (generally, XC card 36), redundant shelf processor cards 38A, 38B (generally, SP card 38), and a backplane (not shown). The invention can be embodied in network elements operating with fewer or more than the twelve Trib cards 34 shown, with zero or one XC card 36, without redundant SP cards 38, or any combination thereof.

The Trib cards 34 generally receive data signals and produce synchronous transport signals therefrom. Different types of Trib cards 34, for handling different signal formats and different signal rates, can be used to practice the invention. For example, signal formats that can be supported include, but are not limited to, DS1, DS3, E1, E3, Ethernet, OC-3, OC-12, OC-48, and OC-192 (also referred to as high-speed tributary cards). Trib cards supporting electrical signals (e.g., DS1, DS3) are generally referred to as electrical tributary cards; those supporting optical signals as optical tributary cards. Embodiments of Trib cards 34 have from one (e.g., an OC-192 port) to 32 ports.

From an operations perspective, the SP cards 38 are the controller of the network element 30 and, in general, control the Trib cards 34 and XC cards 36 for provisioning purposes. Typically, one of the SP cards 38 is referred to as the master shelf processor card 38A and is operating while the redundant SP card 38B functions as a slave card. The redundant shelf processor card 38B includes elements and features similar to the master shelf processor card 38A. The redundant shelf processor card 38B provides redundant functionality of the master shelf processor card 38A within the network element 30 in the event the master shelf processor card 38A experiences a fault or failure. The network element 30 transfers processing responsibility to the redundant shelf processor card 38B if needed to keep the network element 30 operational until the master shelf processor card 38A can be replaced.

Under user control, the SP cards 38 determine the routes taken by traffic between Trib cards 34. Also, the SP cards 38 store additional trigger parameters that can be added to each set of baseline parameters for each protection scheme provided in the default configuration of the network element 30. The SP cards 38 also collect alarms from the Trib cards 34, determine which alarms are relevant, and forward those relevant alarms up to the OAM network 33.

The network element 30 uses out-of-band signaling and the triggering parameters of the present invention to provide protection switching. One form of out-of-band signaling is described in copending U.S. patent application Ser. No. 10/678,486, filed on Oct. 3, 2003 and U.S. patent application Ser. No. 10/678,812, filed on Oct. 3, 2003, the entire contents of both patent applications are incorporated by reference herein. The out-of-band signaling traverses a variety of links between the various cards 34, 36, 38 in the network element 30. Each link is a separate physical connection on the backplane between a pair of cards 34, 36, 38. These links are bi-directional and dedicated to carrying the out-of-band signaling of the protocol.

The XC cards 36 communicate with each other over redundant links 42A, 42B (generally, xc-xc links 42) and with each Trib card 34 over links 44A, 44B. When the links 44A, 44B are carrying out-of-band signals from a Trib card 34 to the XC cards 36, the links are generally referred to as trib-xc links 44. When the links 44A, 44B carry out-of-band signals from an XC card 36 to a Trib card 34, such links are referred to as xc-trib links 44.

In the network element 30, the Trib cards 34 are paired (for implementing various protection schemes, such as 1+1 protection). Links 46, 46' (generally, trib-trib links 46) provide communication paths between pairs of Trib cards 34 that are physically adjacent in the network element 30. Tributary links 46' are double-width links which, in one embodiment, enable tributary cards of double width to communicate with an adjacent double-width tributary card.

The SP cards 38 are each in communication with the XC cards 36 over links 48A, 48B. When carrying out-of-band signals from the SP cards 38 to the XC cards 36, the links 48A, 48B are generally referred to as sp-xc links 48. When carrying out-of-band signals from the XC cards 36 to the SP cards 38, the links 48A, 48B are referred to as xc-sp links 48.

The information exchanged among the cards according to the out-of-band signaling includes 1) status and protection information, such as card status, path status, line status, master-slave status, and path and line protection-switching protocol bytes (e.g., K1, K2, and G1 bytes of SONET/SDH), and 2) messages, such as line protection requests and acknowledgments, and software messaging. This information is used by the cards 34, 36, 38 to provide the path protection within the optical network.

Figure 3:
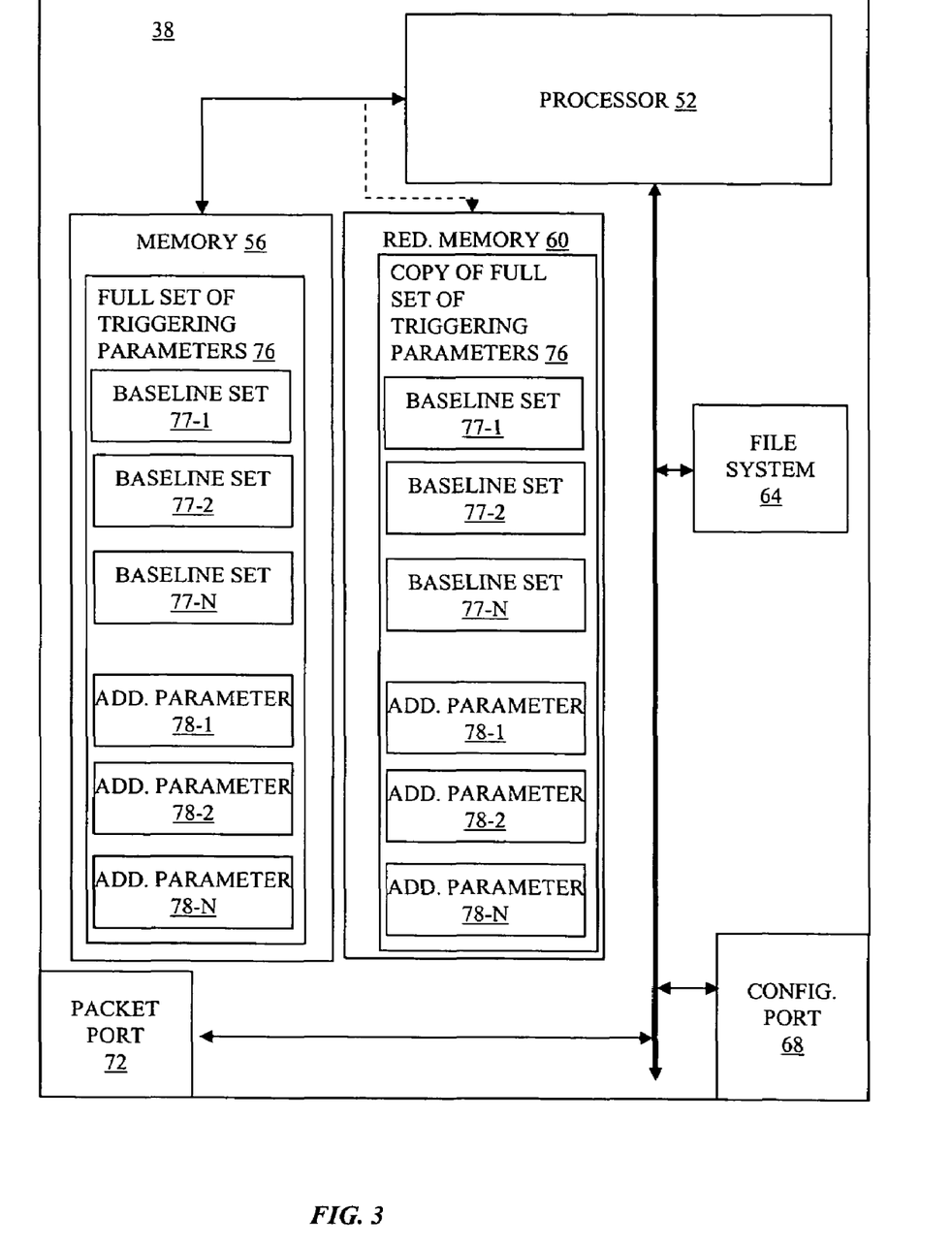
FIG. 3 is a functional block diagram of an embodiment of a shelf processor card of FIG. 2.

FIG. 3 depicts an embodiment of the master shelf processor card 38A in which the principles of the invention may be practiced. The master shelf processor card 38A includes a processor 52, a primary memory element 56, a redundant memory element 60, a file system 64, a configuration port 68, and a packet port 72. The processor 52 is in communication with the primary memory element 56, the redundant memory element 60, and the file system 64 through various signal paths within the master shelf processor card 38A.

The primary memory element 56 provides means to store a full set 76 of triggering parameters for both SONET and SDH, and the redundant memory element 60 contains a copy of the full set 76 to provide redundancy within the master shelf processor card 56A should the primary memory element 56 fail or fault. In general, the full set 76 includes triggering parameters to implement SONET and SDH line protection switching, triggering parameters to implement SONET and SDH path protection switching, and triggering parameters to implement SONET and SDH ring protection switching. More specifically, the full set 76 includes a set of baseline parameters for each protection scheme and any additional parameters missing from these baseline parameters sets that are needed by either the SONET and SDH standards to fully implement a given protection scheme. For example, SONET uses four triggering parameters to determine when to invoke a path switch according to UPSR. In the corresponding SDH protection scheme (i.e., SNCP) there are two triggering parameters. These two triggering parameters are common to the two of the four triggering parameters of the SONET standard. The full set 76 has the two triggering parameters common to UPSR and SNCP, and the fourth triggering parameter required to complete the implementation of SONET ring protection. The full set 76 can alternatively include the four trigger parameters required to provide UPSR in SONET and the two triggering parameters required to provide SNCP.

The common parameters for each protection scheme (e.g., line, path, and ring) are identified as respective sets of baseline parameters 77-1, 77-2, 77-N (generally, set of baseline parameters 77) and are stored in the primary memory element 56. In one embodiment, the SP card 38A transmits the sets of baseline parameters 77 to the Trib cards 34 to place the network element in the default configuration (e.g., upon power up of the network element). In another embodiment, each Trib card 34 is preconfigured with the sets of baseline parameters 77. The SP card 38A sends additional parameters 78-1, 78-2, 78-N (generally, additional parameter 78) to each Trib card 34 as needed by the particular optical transport standard followed by that Trib card 34.

The configuration port 68 provides a means to connect to the remote element 32 (FIG. 1). Changes to the default configuration (e.g., adding additional triggering parameters 78 to or removing triggering parameters from the baseline parameter sets) can occur by issuing command from the remote element 32 to the master shelf processor 38A through the configuration port 68. In one embodiment, the configuration port 68 is an RS 232 port. The additional triggering parameters 78 are activated through a graphical user interface (GUI) displayed on the remote device 32. In general, site management software that is included on the remote element 32 generates the GUI and communicates with the network element 30 using TL-1 commands. Through the GUI, the network element can be remotely provisioned.

The packet port 72 is in communication with the backplane of the network element 30. Functions provided by the packet port 72 include, but are not limited to, placing communications traffic on the backplane and sending the sets of baseline parameters 77 and additional triggering parameters 78 to the other cards 34, 36.

Figure 4:
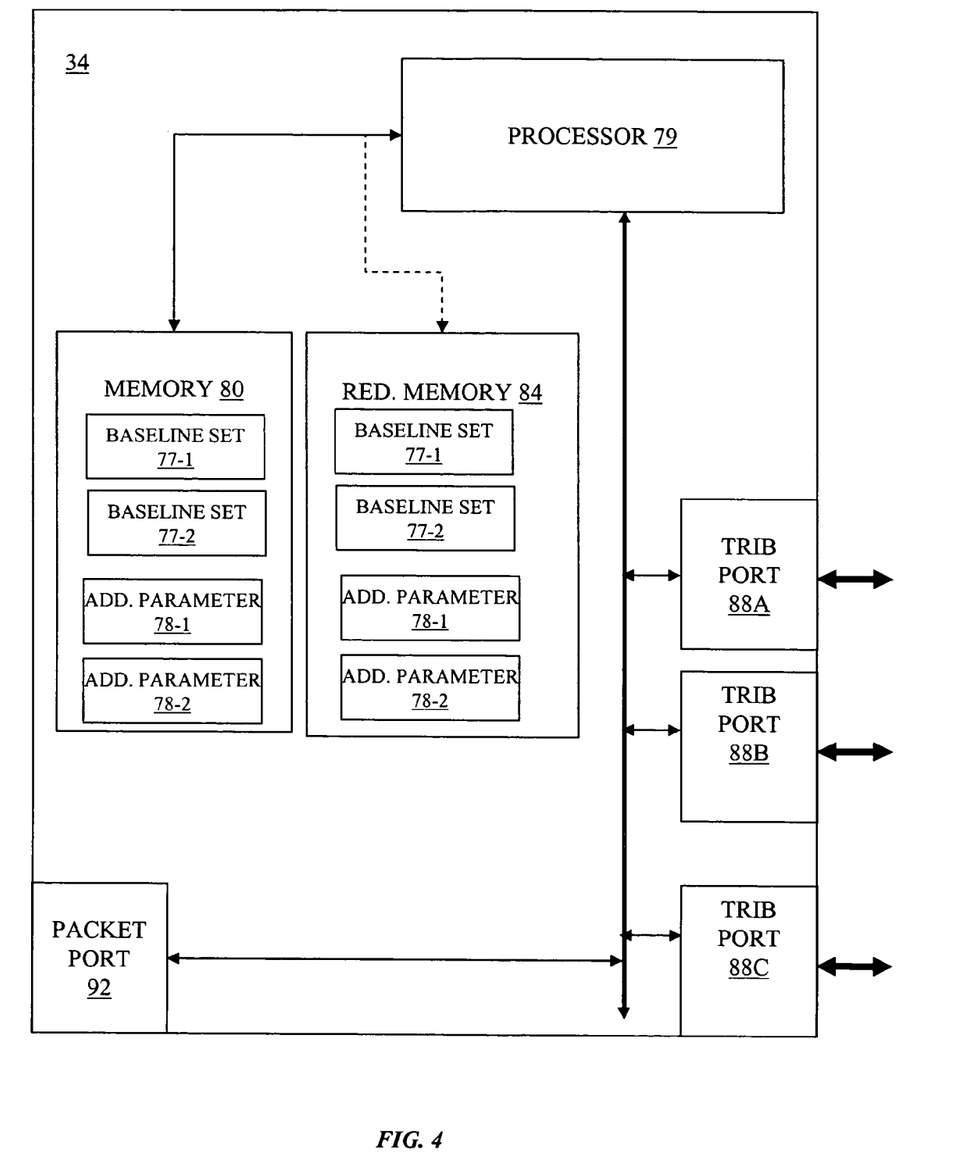
FIG. 4 is a functional block diagram of an embodiment of a tributary card of FIG. 2.

FIG. 4 shows a functional diagram of an embodiment of each Trib card 34 of FIG. 2 in which principles of the invention can be practiced. Each Trib card 34 includes a processor 79, a primary memory element 80, a redundant memory element 84, a plurality of tributary ports 88A, 88B, 88C (referred to generally as tributary port 88), and a packet port 92. The processor 76 is in communication with the primary memory element 80 and the redundant memory element 84 through various communication paths within the tributary card. The network element 30 receives communications traffic through the tributary ports 88.

The primary memory element 80 stores a set of baseline parameters 77 for each supported protection scheme (only two are shown for clarity) and any additional triggering parameters 78 (again, only two are shown for clarity) that are needed for those protection schemes to operate according to either the SDH or SONET standard. The redundant memory element 84 contains a copy of the set of baseline parameters 77 and additional triggering parameters 78 of the primary memory element 80 to provide redundancy within the Trib card 34 should the primary memory element 80 fault or fail. The processor 76 includes program code for monitoring the status of the Trib card 34 and issuing communications according to the out-of-band signaling mechanism to provide path protection.

To illustrate the operation of the Trib card 34, consider, for example, an embodiment in which each tributary port 88 of the Trib card 34 supports SONET traffic and that the baseline parameter set for ring protection provides only three of the four triggering parameters needed to support this protection scheme. The primary memory element 80 stores this set of baseline parameters 77, but in order to comply fully with the SONET standard, this missing fourth triggering parameter is added to the Trib card 34. The additional triggering parameter is also stored in the primary memory element 80 and associated with each tributary port 88.

Consider as another example, that each tributary port 88 of the Trib card 34 supports SDH traffic. If one or more additional triggering parameters 78 are required by SDH for implementing any of the protection schemes beyond what is provided by the baseline parameter sets, these can be obtained from the master shelf processor card 38A and stored in the primary memory element 80.

The different tributary ports 88 of the network element 30 can also support different optical transport standards simultaneously (i.e., the tributary ports 88 are individually configurable for either SONET or SDH). Consider, for example, that one tributary port 88A supports SONET traffic and another tributary port 88B supports SDH traffic, and that for a given protection scheme both standards require four triggering parameters, three of which are common and are provided in a baseline parameter set for this protection scheme. Consider also, for the purposes of this example, that the fourth triggering parameter needed by the SONET tributary port 88A is different from the fourth triggering parameter needed by the SDH tributary port 88B. Accordingly, the baseline parameter set with the three common triggering parameters is associated with both tributary ports 88A and 88B, one additional triggering parameter 78-1 is associated with tributary port 88A, and another additional triggering parameter 78-2 is associated with tributary port 88B.

Figure 5:
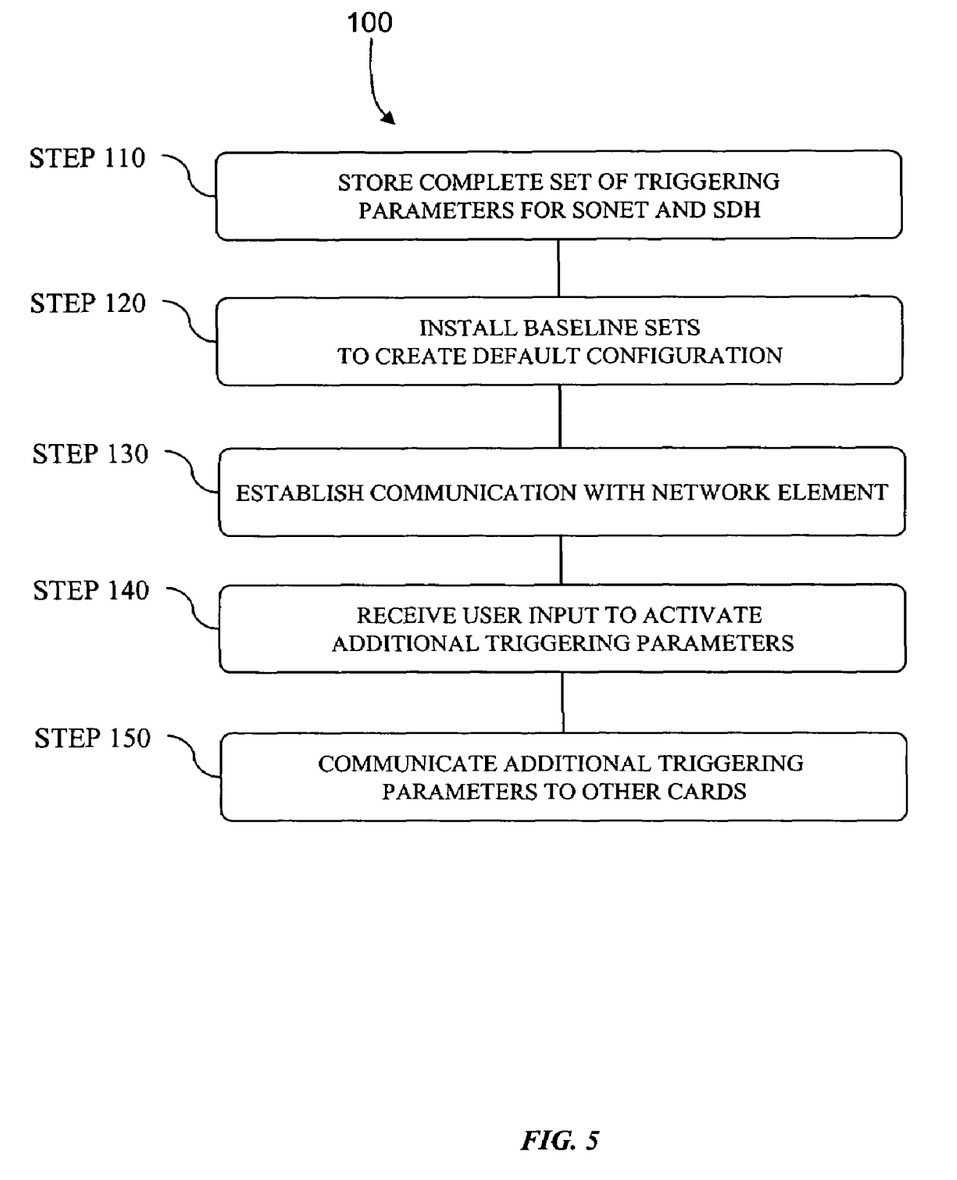
FIG. 5 is a flow chart of an embodiment of a method for configuring an optical network element to support protection switching according to principles of the invention.

FIG. 5 is a flow chart depicting an embodiment of a method 100 of configuring the network element 30 to provide protection switching according to principles of the invention. As a general overview, during installation the network element 30 is provisioned with a set of baseline parameters 77 of each type of protection scheme to place the network element in the default configuration. Each set of baseline parameters 77 is not specific to an optical transport standard; instead, the sets of baseline parameters feature those triggering parameters common to each standard. A user communicates with the network element 30 to provide additional triggering parameters 78 as required by the type of optical network in which the network element 30 is deployed.

More specifically, the master shelf processor card 38A stores (step 110) the full set 76 of triggering parameters for SONET and SDH, including the set of baseline parameters 77 for each of the supported protection schemes and those additional parameters 78 needed to complete the implementation of each protection scheme for SONET, SDH, or both. The set of baseline parameters 77 can be established remotely to the network element 30 and transferred to the master shelf processor card 38A. Alternatively, the master shelf processor card 38 can determine the set of baseline parameters 77 from the full set 76 of triggering parameters. The set of baseline parameters 77 are installed (step 120) on some or on each of the other cards 34, 36 of the network element 30.

The user establishes (step 130) a communication link to the master shelf processor card 38A using the remote element 32. Interaction between the user and a graphical user interface occurs on the remote element 32 using management software operating on the remote device 32. The graphical user interface receives (step 140) input indicative of any additional triggering parameters 78 to activate. In one embodiment, the user expressly activates each additional triggering parameter 78 needed by each Trib card 34 to implement the desired suite of protection schemes. In another embodiment, the user indicates to the management software the particular optical standard according to which the network element is operating (e.g., SONET) and the type of protection scheme to be configured (e.g., UPSR). In response, the management software automatically communicates with the network element 30 to provision each additional triggering parameter 78 to achieve the suite of protection schemes for the identified standard. The master shelf processor 38A sends (step 150) these additional triggering parameters to the other cards 34, 36.

While the invention has been shown and described with reference to specific preferred embodiments, it should be understood by those skilled in the art that various changes in form and detail may be made therein without departing from the spirit and scope of the invention as defined by the following claims. For example, another function of the management software can be to remove triggering parameters currently installed on a Trib card. Removed parameters can be taken from one or more of the baseline parameter sets or can be an additional triggering parameter that had been previously sent to the Trib card 34 but is no longer needed (e.g., because the Trib card is operating according to a different optical transport standard).

What is claimed is:

1. A method of configuring an optical network element to support protection switching in either an SDH or a SONET optical network, the method comprising:
   storing in memory of a shelf processor card in the optical network element a complete set of triggering parameters for implementing protection switching in an SDH optical network and a complete set of triggering parameters for implementing protection switching in a SONET optical network;
   determining a default set of triggering parameters in which each triggering parameter is common to SDH and SONET optical transport standards for providing protection switching;
   configuring a second card of the optical network element with the default set of triggering parameters, the default set lacking one or more triggering parameters required to perform a given protection scheme in at least one of the SDH and SONET networks; and
   obtaining from one of the complete sets of triggering parameters and transmitting from the shelf processor card to the second card of the network element each triggering parameter required to perform the given protection scheme but lacking in the default set after the network element is deployed in a type of optical network that requires that lacking triggering parameter in order for the second card of the optical network element to perform the given protection scheme.

2. The method of claim 1 further comprising receiving user input indicative of each lacking triggering parameter through a graphical user interface.

3. The method of claim 1 further comprising removing one triggering parameter from the default set.

4. The method of claim 1 wherein the default set of triggering parameters includes triggering parameters that are common to SDH and SONET optical transport standards for providing path protection switching.

5. The method of claim 1 wherein the default set of triggering parameters includes triggering parameters that are common to SDH and SONET optical transport standards for providing line protection switching.

6. The method of claim 1 wherein the default set of triggering parameters includes triggering parameters that are common to SDH and SONET optical transport for providing ring protection switching.

7. A network element for use in either a SDH or a SONET network comprising:
   a shelf processor card having memory storing a complete set of triggering parameters for implementing protection switching in an SDH network and a complete set of triggering parameters for implementing protection switching in a SONET network;
   a plurality of other cards each configured with a default set of triggering parameters in which each triggering parameter is common to SDH and SONET optical transport standards, the default set lacking one or more triggering parameters required to perform a given protection scheme in at least one of the SDH and SONET networks; and
   an interface through which a user can instruct the shelf processor card to transmit, from one of the complete sets of triggering parameters stored at the shelf processor card to each other card in the network element, each triggering parameter required to perform the given protection scheme but lacking in the default set of that other card after the network element is deployed in a type of optical network requiring the lacking triggering parameter in order for that other card of the network element to perform the given protection scheme.

8. The network element of claim 7 wherein the interface is a graphical user interface operating on a remote device in communication with the network element.

9. The network element of claim 7 wherein at least one of the plurality of other cards is a cross-connect card.

10. The network element of claim 7 wherein at least one of the plurality of other cards is a tributary card.

11. The network element of claim 7 wherein the given protection scheme is line switching.

12. The network element of claim 7 wherein the given protection scheme is path switching.

13. The network element of claim 7 wherein the given protection scheme is ring switching.

14. A network element for use in either a SDH or a SONET optical network comprising:
   a shelf processor card having memory storing a complete set of triggering parameters for implementing protection switching in an SDH optical network and a complete set of triggering parameters for implementing protection switching in a SONET optical network;

means for determining a default set of triggering parameters in which each triggering parameter is common to SDH and SONET optical transport standards for providing protection switching;

means for configuring a second card of the network element with the default set of triggering parameters, the default set lacking one or more triggering parameters required to perform a given protection scheme in at least one of the SDH and SONET optical networks; and means for obtaining from one of the complete sets of triggering parameters and transmitting from the shelf processor card to the second card of the network element each triggering parameter required to perform the given protection scheme but lacking in the default set after the network element is deployed in a type of optical network that requires the lacking triggering parameter in order for the second card of the network element to perform the given protection scheme.

15. The network element of claim 14 further comprising means for graphically receiving user input indicative of each lacking triggering parameter to be sent to the card.

16. The network element of claim 14 wherein the given protection scheme is path switching.

17. The network element of claim 14 wherein the given protection scheme is ring switching.

18. The network element of claim 14 wherein the given protection scheme is line switching.

* * * * *